April 5, 1966     H. A. RAFLER     3,244,994
SAFETY DEVICE FOR MAGNETIC AMPLIFIERS
Filed May 21, 1962
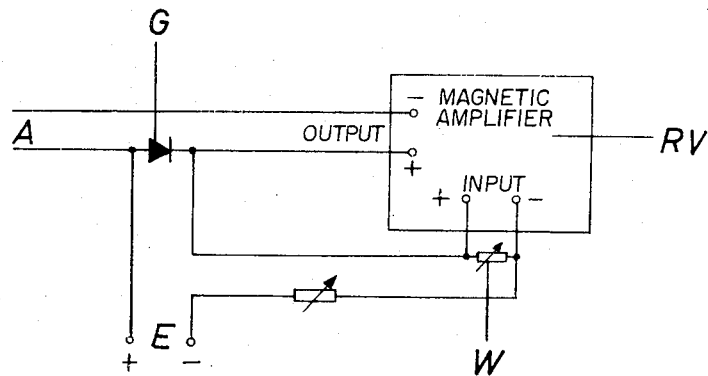
INVENTOR
HELFRIED A. RAFLER

United States Patent Office 3,244,994
Patented Apr. 5, 1966

3,244,994
SAFETY DEVICE FOR MAGNETIC AMPLIFIERS
Helfried Anton Rafler, Wilhermsdorf uber Neustadt, Germany, assignor to International Standard Electric Corporation
Filed May 21, 1962, Ser. No. 196,271
Claims priority, application Germany, May 31, 1961, St 17,887
2 Claims. (Cl. 330—8)

The present invention relates to a safety device for magnetic amplifiers such as used in transductor-controlled power-supply systems, and more particularly to rectifying devices which are used for charging batteries, for providing the power supply in telephone systems, and in galvanic systems, or the like.

In this kind of equipment a difficulty is encountered which causes the magnetic amplifier to be fully driven upon interruption of the input circuit. Consequently, as in the case of battery chargers, the output voltage will assume an undesirable high value which may cause damage to or destruction of the connected battery which is to be charged.

This difficulty is overcome by the present invention which basically consists of a rectifier or a rectifying device operating as a current-dividing network, which is connected in the blocking direction in the output circuit of the magnetic amplifier, while the input circuit of the magnetic amplifier is connected in the forward direction of the same rectifier.

Rectifiers operating as current-dividing networks are presently known. These rectifiers are intended for use in circuit arrangements for current limitation, employing several parallel-arranged loads, such as regulated rectifying devices, and are adapted to select the respective greater current, and to feed this current as a reference to the regulator.

The object of the present invention is to provide a novel current-dividing network serving as a safety device, as will now be explained with reference to an example of one embodiment.

The figure is a schmatic drawing of the circuit.

According to the invention, the output circuit A of a conventional magnetic amplifier RV comprises a rectifier G which is connected in the blocking direction with respect to the output from RV. The input circuit E is also connected with the polarities as shown, so that the input direct current to the amplifier will flow in the forward direction of the same rectifier G. The novelty of the current-dividing network resides in the fact that the current of the output circuit of the amplifier RV which may, for example, be supplied to a reactance control coil of a magnetic amplifier controlled power-supply system,, will flow freely in the blocking direction via the rectifier G, as long as the current of the input circuit is greater than the current of the output circuit. Thus, upon interruption of the input circuit which, in practice, may be caused by interference or the like, no current will flow via the rectifier G in the forward direction, and the rectifier will block the output circuit.

Accordingly, the circuit arrangement of the invention acts as a reliable safety device.

In order to properly relate the input circuit to the output circuit, an adjustable parallel resistance W can be inserted into the input circuit to cause the current in the input circuit to become greater in relation to that of the output circuit.

What is claimed is:

1. A safety device for protecting a magnetic amplifier power supply system from excessive voltages comprising a magnetic amplifier having input and output circuit means, a rectifier having one terminal connected in series with one terminal of said output circuit and poled to block the output current from passing therethrough, a source of input current having one terminal connected to the other terminal of said rectifier and a second terminal connected to one terminal of said input circuit, said one terminal of said rectifier having a further connection to the other terminal of said input circuit and poled to permit input current to pass therethrough, said output circuit and rectifier means being blocked upon interruption of said input current.

2. The device of claim 1 including adjustable resistance means connected between said input terminals and having a portion in series with said rectifier to form a voltage divided to adjust said input current to be larger in relation to said output current.

References Cited by the Examiner
UNITED STATES PATENTS
2,957,117  10/1960  Lapuyade _____ 320—43 X NATHAN KAUFMAN, Acting Primary Examiner.
ROY LAKE, Examiner.